Dec. 2, 1969

C. B. DE GANAHL 3,481,369

REINFORCED PLASTIC PIPE

Filed June 16, 1967

INVENTOR.
Carl Brice de Ganahl
BY

ATTORNEYS

United States Patent Office 3,481,369
Patented Dec. 2, 1969

3,481,369
REINFORCED PLASTIC PIPE
Carl Brice de Ganahl, Plainfield, N.J., assignor to
Carl de Ganahl, Locust, N.J.
Filed June 16, 1967, Ser. No. 646,539
Int. Cl. F16l 9/10, 9/14, 9/16
U.S. Cl. 138—144                  5 Claims

ABSTRACT OF THE DISCLOSURE

A glass fiber reinforced plastic pipe is prepared by first applying continuously upon an advancing mandrel one or more layers of a plastic film to form an inner layer for the pipe and thereafter applying continuously first a layer of scrim upon the liner and then on the scrim plural layers of glass fiber rovings impregnated with a liquid thermosetting polymer, compatible and cross-linkable with the plastic liner to form a pipe structure. The resultant pipe structure is treated at a temperature sufficient to cure and simultaneously to cross-link the liner and the thermosetting polymer thereby forming a monolithic reinforced plastic pipe substantially devoid of pinholes in the liner.

BACKGROUND OF THE INVENTION

Field of the invention

This invention relates to glass fiber reinforced plastic pipe and, more particularly, to the manufacture of a plastic pipe structure which comprises an inner plastic liner integrally bonded to and cross-linked with a monolithic and substantially impervious hollow cylindrical body of a thermoset polymer and having embedded therein a multiplicity of glass fiber rovings as reinforcing elements.

Description of the prior art

Glass fiber reinforced plastic pipe is well known. It is fabricated, preferably, by applying a multiplicity of glass fiber rovings coated and impregnated with an uncured liquid plastic composition about a pipe-forming mandrel the plastic impregnated rovings being applied about the mandrel in a plurality of concentric layers of rovings to build up a pipe wall of the desired thickness and strength. As the individual glass fiber rovings are laid on the mandrel, the liquid plastic composition thereon runs together with the liquid plastic on adjoining rovings, and with liquid plastic on underlying and overlying layers of rovings, to form a coherent and continuous body of liquid plastic through which the glass fiber roving is extended. This coherent body of liquid plastic is then heated to cure the plastic composition and thus form the desired glass fiber reinforced plastic pipe. The glass fiber rovings are preferably applied to the mandrel so that they are disposed both helically and axially (i.e., longitudinally) with respect to the longitudinal axis of the finished pipe.

The plastic reinforced pipe is generally provided with a plastic inner lining by applying to the pipe-forming mandrel a helically wound layer of plastic film prior to the application of glass fiber rovings. The lining thus applied is laminated to the plastic material in the main body of the pipe structure during the curing of the latter. An outer plastic covering is also often used to provide protection against ultraviolet degradation of the plastic composition, and to provide chemical and abrasion resistance, and is similarly laminated to the pipe structure.

The plastic materials for the pipe structure are generally epoxy and polyester resins and for the liner are a blend of vinyl polymers plasticized with polymerizable thermosetting resins. More recently, polymers with more desirable properties for the fabrication of plastic reinforced pipes have become available commercially. Two attractive plastic materials for the lining and pipe structure, respectively, are polyolefin and polydiolefin.

The aforesaid technique for fabricating glass fiber reinforced plastic pipe, however, has a tendency to produce pinholes in the plastic liner and dark discoloration at the outer surface of the pipe, which is particularly noticeable when polyolefin and polydiolefin are used, respectively, for the liner and the pipe. The formation of the pinholes is due to an interdiffusion of the plastic liner and the liquid thermosetting resin during co-curing and crosslinking. The end product with pinholes and surface discoloration in the liner is undesirable.

SUMMARY OF THE INVENTION

It has now been discovered that the pinholes in the liner can be eliminated by using a textile scrim as a barrier between the liner and the pipe in the method of this invention. Broadly stated, the method of this invention comprises applying upon a pipe-forming mandrel at least one layer of a plastic film to form an inner liner for the pipe and thereafter applying continuously first a layer of scrim upon the liner and then on the scrim plural layers of glass fiber rovings impregnated with a thermosetting polymer compatible and cross-linkable with the plastic liner to form a pipe structure. The pipe structure is then subjected to a treatment at a temperature sufficient to cure the thermosetting polymer and simultaneously to cross-link the thermosetting polymer with the plastic liner thereby forming a monolithic glass fiber reinforced pipe.

The resultant pipe comprises a plastic inner liner devoid of pinholes and integrally bonded to and cross-linked with a monolithic and substantially impervious hollow cylindrical body of a thermoset polymer having a multiplicity of reinforced glass fiber rovings embedded therein. The layer of scrim is positioned between the liner and reinforced plastic body and embedded therein to form an integral part of the pipe structure. Advantageously, the pipe is provided with an outer plastic covering integrally bonded to and cross-linked with the main body of the pipe. Pipe constructed as described possesses exceptionally high strength for its weight and is highly resistant to the corrosive effects of most organic and inorganic liquids. It has found wide use where the resistance of the pipe to chemical attack is of importance.

BRIEF DESCRIPTION OF THE DRAWINGS

In the accompanying drawings.

DESCRIPTION OF THE PREFERRED EMBODIMENTS

Figure 1:
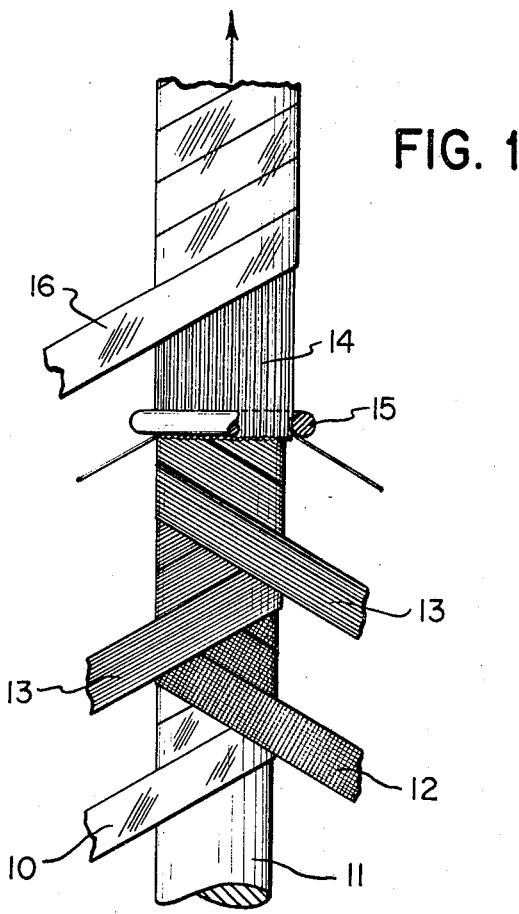
FIG. 1 shows the manner in which the various components of the improved pipe are laid on the pipe-forming mandrel in the course of manufacturing the pipe.

As shown in FIG. 1, the method of manufacturing plastic pipe pursuant to the invention advantageously comprises applying at least one layer of a plastic tape preferably a polyolefin tape 10 about an upwardly advancing pipe-forming mandrel 11. Any desired number of layers of such liner tapes may be wrapped in place as required to build up the liner thickness to the desired fill, which typically is at least 0.010 inch and may be as great as 0.075 inch. Thereafter, there is applied a layer of textile scrim 12 to wrap about the plastic liner tapes with about ⅛ inch to ¼ inch overlap, and about the scrim are wrapped one or more layers of glass fiber rovings 13 and 14, or equivalent reinforcing material coated and impregnated with an uncured thermosetting liquid polymer, preferably a polydiolefin mixture.

The concentric layers of plastic impregnated rovings are applied about the mandrel so that the rovings of these layers 13 are helically disposed, and at least one more of the concentric layers of rovings are applied so that the rovings of this layer 14 are axially disposed with respect to the axis of the mandrel. As shown in FIG. 1, the rovings of at least one of the helically dispersed layers 13 are applied to the mandrel so that the pitch of the rovings is opposite in direction (and advantageously equal in magnitude) to the pitch of the rovings of at least one other of the layers 13 of helically disposed rovings. Moreover, the layer or layers 14 of axially disposed rovings are laid on the mandrel so that the axial rovings advantageously comprise the outermost of the concentric layers of rovings.

In order to lay the axially disposed rovings of the layer 14 on the mandrel so that they will closely contact the underlying pipe structure, the axial rovings are advantageously brought into close proximity with the said underlying pipe structure by means of a guide ring 15 (shown partly in section), the inside diameter of which is only slightly greater than the external diameter of the plastic pipe. An outer tape 16 is advantageously applied about the outermost layer of plastic impregnated fibers to help retain the uncured resin in place of the mandrel. As will be readily appreciated, other layers of the same or similar plastic materials can be applied about the mandrel under or over the above-mentioned plastic layers, as hereinafter more fully explained.

The various layers of materials can be applied to the mandrel by any suitable technique. I presently prefer to advance the pipe-forming mandrel 11 upwardly through the central openings of a number of annular tables (not shown) from which are dispensed in succession the plastic tape 10 and the scrim 12, the several layers of plastic impregnated glass fiber rovings 13 and 14, and the outer tape 16.

The plastic tape 10 is preferably blended with a cross-linking catalyst or a cross-linking plasticizer or monomer for cross-linking the liner and the thermosetting polymer. After the various components of the pipe are applied to the mandrel 11, the plastic materials are heated to cure the liquid polymer and simultaneously cross-link the liner film and the liner while it is on the mandrel. After the resins have been completely cured, the resulting pipe is removed from the mandrel simply by sliding it therefrom. (A layer of parting tape, such as cellophane or Mylar tape, may be used between the mandrel and the liner to facilitate the removal of the pipe thus formed.)

Figure 2:
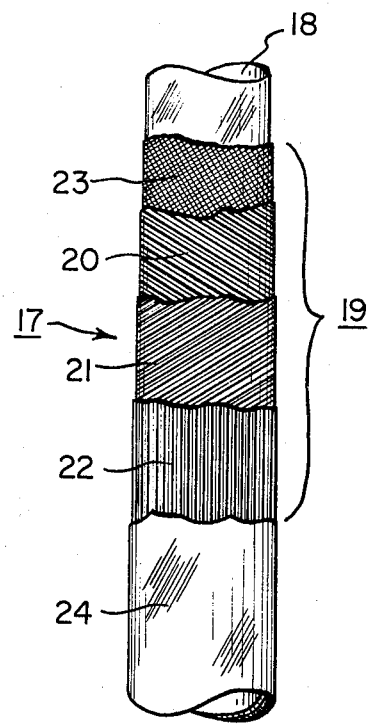
FIG. 2 is a fragmentary view of the improved plastic pipe produced pursuant to the present invention.

As shown in FIG. 2 of the drawing, the plastic pipe 17 produced by the method of this invention has an integrally formed structure comprising a smooth impervious plastic inner lining 18 integrally bonded and cross-linked with a glass fiber reinforced plastic pipe body 19. The impervious inner lining 18 of the pipe 17 comprises the cured plastic composition from which the tape 10 was formed, adjoining turns of the tape 10 fusing and bonding together, and to any underlying or overlying tapes of similar composition, when the plastic materials are heated to their curing temperature. In like manner, the plastic pipe body 19 comprises the cured coherent body of the thermosetting polymeric composition with which the glass fibers 13 and 14 are coated, the uncured liquid polymer coating on each fiber 13 running together with the coatings on adjoining fibers, and on underlying and overlying fibers, to form the aforesaid coherent body of resin.

The plastic pipe 17 after curing is in the form of a monolitic hollow cylindrical plastic pipe body through which extend a plurality of concentric layers of glass fiber rovings 20, 21, and 22 and a layer of scrim 23. The layer of scrim is, as mentioned hereinabove, firmly embedded in the liner 18 to become an integral part thereof. The layers of glass fiber rovings comprise the two inner layers 20 and 21 of helically disposed rovings and the outermost layer (or layers) 22 of axially disposed rovings. In addition, the plastic pipe structure 17 includes an impervious outer covering or sheath 24 that is securely bonded, as by cross-linking, similar to the inner liner, to the monolithic plastic pipe body through which the reinforcing elements extend. The integral or monolithic structure of the pipe 17 is due to the chemical bond as by copolymerization and cross-linking that exists between the composition of the inner lining 18 and that of the pipe body 19 and also between the outer covering and the pipe body.

The plastic pipe of this invention possesses the superior strength inherent in glass fiber reinforced plastic bodies, and, moreover, the liner is devoid of pinholes due to the use of scrim as a barrier between the liner 18 and the pipe body 19. The scrim greatly improves the adhesion of the liner to the pipe body. The reason for such improvement is not known, but the fact is that the tear resistance of the liner against separation from the pipe body is very greatly increased by the provision of the scrim.

The suitable scrim for the present invention is preferably woven from glass fibers. Scrim woven from plastic fibers such as Orlon or nylon also can be used if the pipe is not to be subjected to excessive curing temperatures or high temperature in services. The scrim may range from fine to coarse meshes. A typical scrim suitable for the present invention has 15 to 40 threads per linear inch. The glass fiber scrim, which is normally starched to prevent it from unraveling, may be used without any special treatment to remove the starch.

The liquid thermosetting polymer suitable for the present invention may be compounded from plastic materials such as epoxy and polyester resins, and the liner suitable for use in combination with this type of plastic materials is a blend of vinyl polymers plasticized with polymerizable thermosetting resins. Examples of these types of plastic materials are described in U.S. Patent No. 2,815,043 to Kleiner et al. The preferred plastic materials for the liner and the pipe in the present invention, however, are polyolefin and polydiolefin, respectively.

The liquid polydiolefin compositions are prepared from conjugated diolefins having 4 to 6 carbon atoms per molecule. Examples of these diolefins are butadiene, hexadiene, isoprene, dimethyl butadiene, piperylene, and methyl pentadiene. The diolefin preferably is copolymerized with a minor amount of ethylenically unsaturated monomers such as styrene, acrylonitrile, methyl vinyl ketone, or with styrene having alkyl groups substituted on the ring, e.g., paramethyl styrene, dimethyl styrene and vinyl toluene. A preferred polydiolefin composition is prepared by reacting 75 to 100 parts by weight of butadiene and 25 to 0 parts by weight of styrene in the presence of metallic sodium catalyst. The polymerization advantageously is carried out in an aliphatic hydrocarbon medium boiling between −15° C. and 200° C. such as Varsol. The amount of sodium catalyst used is about 0.5 to 5 parts per 100 parts of monomer, and the amount of hydrocarbon used is about 100 to 500 parts per 100 parts of monomer.

To obtain a water white product, a co-diluent may be used at the rate of 10 to 45 parts per 100 parts of monomer. The suitable co-diluents are aliphatic ethers, cyclic ethers, and polyethers having 4 to 8 carbon atoms and lacking a —O—C—O— grouping. Particularly useful co-diluents are 1,4 dioxane, and diethyl ether. It is also advantageous to use an alcohol in an amount equivalent to 5 to 35 weight percent of the sodium to overcome the initial induction period.

The polydiolefin thus obtained may contain other monomeric cross-linking agents. The suitable cross-linking monomers include styrene, toluene, dimethyl styrene, 2,4 dichlorostyrenes, butyl methacrylates, diethyl fumarate, allyl acetate, vinyl stearate and mixtures thereof. These additional cross-linking agents may be presented in the range of 0 to 70% by weight of the curable liquid mixture, preferably in the range between 30% to 50%. A small amount (e.g., 1-6 p.h.r.) of difunctional cross-linking components such as divinyl benzene, ethylene dimethacrylate and diallyl phthalate may also be advantageously used.

To facilitate the curing of the polydiolefin composition, a catalyst is incorporated therein within the range of 0.5% to 10%, preferably 2% to 4%, by weight. Advantageously, free radical or peroxide type such as dialkyl or aralkyl peroxides are used. The preferred catalyst is 2,5-dimethyl-2,5 di(t-butylperoxy)hexyne-3, although other peroxides such as a mixture of dicumyl peroxide and ditertiary butyl peroxide may be used.

The preferred polydiolefin composition is prepared by blending an 80/20 butadiene-styrene copolymer with vinyl toluene. The final polymeric composition contains about 60% by weight of butadiene-styrene copolymer (48% butadiene and 12% styrene) and 40% by weight of vinyl toluene. The composition may contain 2% to 4% by weight of 2,5-dimethyl-2,5-di(t-butylperoxy) - hexyne - 3. Alternatively, it may contain 2% to 4% by weight of a catalytic mixture of dicumyl peroxide and di-t-butyl peroxide.

The polyolefin film for the inner liner is prepared from a monomer which contains 2 to 12 carbon atoms per molecule, e.g., polyethylene, polypropylene, polybutene, polyheptene, ethylene - propylene copolymers, ethylene-styrene copolymers and the like. The polyolefin may be prepared in any known manner. For the present invention the preferred polyolefin is polyethylene which may have a wide range of molecular weight, e.g., 1000 to 3000 for the low density polyethylene to the upper range of 50,000 to 500,000 for the high density polyethylene.

The cross-linking catalyst in the polyolefin film is a difunctional peroxide suitable for cross-linking the polyolefin and polydiolefin mixture. The peroxide used, however, must be sufficiently stable to enable it to be compounded with polyethylene or other polyolefins. Among the suitable difunctional peroxides, 2,5 dimethyl-2,5-di(t-butylperoxy)hexyne-3 is found to be eminently suitable.

The liner film is prepared preferably by extruding a polyethylene compounded with carbon black and 2,5 dimethyl-2,5-di(t-butylperoxy)-hexyne-3 and stretching the freshly extruded material by pulling it around a rather sharp angle immediately upon extrusion to produce a film which may be as thin as 0.004 inch. In general, film with a thickness in the range between 0.005 inch and 0.015 inch is suitable as a liner for the present invention.

The glass fiber rovings suitable for the present invention are well known and further description is not necessary. However, it should be pointed out that the sizing used for the rovings should be compatible with the diolefin composition used in order to obtain the optimum results. Such sizing is also known and requires no further description. Other known treatments of the glass fiber to improve its resin wetting characteristics may also be used.

To cure the polydiolefin and simultaneously to cross-link it with the polyolefin liner, the pipe structure is heated on the mandrel at atmospheric pressure and preferably to a range between 250° F. to 450° F. Lower temperatures, however, can be used at which the curing rate may be exceedingly slow as to be economically undesirable. For the method of the present invention, the curing and cross-linking is advantageously carried out by using rapidly circulated hot air.

For a reinforced plastic pipe using an 80/20 butadiene-styrene copolymer blended with 40% by weight of vinyl toluene as the thermosetting plastic and polyethylene blended with 2,5-dimethyl-2,5-di(t-butylperoxy)hexyne-3 as the liner, the optimum curing condition is obtained using air heated to about 375° to 400° F.

I claim:
1. A glass fiber reinforced plastic pipe comprising a plastic inner liner substantially devoid of pinholes and integrally bonded to and cross-linked with a monolithic and substantially impervious hollow cylinder body of a thermoset polymer reinforced with a multiplicity of glass fiber rovings embedded therein and a scrim disposed and embedded in the liner and adjacent the cylindrical body and forming an integral part of the pipe structure.

2. A glass fiber reinforced plastic pipe of claim 1 wherein the scrim is woven from a plastic material.

3. A glass fiber reinforced plastic pipe of claim 1 wherein the scrim is woven from glass fibers.

4. A glass fiber reinforced plastic pipe of claim 3 wherein the liner is polyethylene and the thermoset polymer is a blend of vinyl toluene and a copolymer of butadiene and styrene.

5. A glass fiber reinforced plastic pipe of claim 4 further characterized by having a polyethylene covering thereon integrally bonded to and cross-linked with the cylinder body.

References Cited

UNITED STATES PATENTS

| | | | |
|---|---|---|---|
| 2,742,931 | 4/1956 | De Ganahl | 138—144 |
| 2,814,313 | 11/1957 | Tate | 138—144 |
| 2,815,043 | 12/1957 | Kleiner et al. | 138—144 |
| 2,969,812 | 1/1961 | De Ganahl | 138—144 X |
| 3,002,534 | 10/1961 | Noland | 138—144 X |

LOUIS K. RIMRODT, Primary Examiner

U.S. Cl. X.R.

138—153